United States Patent
Zhao et al.

(10) Patent No.: US 12,143,592 B2
(45) Date of Patent: Nov. 12, 2024

(54) SYSTEMS AND METHODS FOR TEMPORAL MOTION VECTOR PREDICTION CANDIDATE DERIVATION

(71) Applicant: Tencent America LLC, Palo Alto, CA (US)

(72) Inventors: Liang Zhao, Palo Alto, CA (US); Xin Zhao, Palo Alto, CA (US); Han Gao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 48 days.

(21) Appl. No.: 18/207,582

(22) Filed: Jun. 8, 2023

(65) Prior Publication Data
US 2024/0080451 A1    Mar. 7, 2024

Related U.S. Application Data

(60) Provisional application No. 63/403,642, filed on Sep. 2, 2022.

(51) Int. Cl.
*H04N 19/139* (2014.01)
*H04N 19/105* (2014.01)
(Continued)

(52) U.S. Cl.
CPC ......... *H04N 19/139* (2014.11); *H04N 19/105* (2014.11); *H04N 19/129* (2014.11);
(Continued)

(58) Field of Classification Search
CPC .. H04N 19/139; H04N 19/105; H04N 19/129; H04N 19/159; H04N 19/176; H04N 19/52; H04N 19/70
See application file for complete search history.

(56) References Cited

U.S. PATENT DOCUMENTS

2012/0195368 A1    8/2012    Chien et al.
2013/0188715 A1    7/2013    Seregin et al.
(Continued)

OTHER PUBLICATIONS

Benjamin Bross et al., "Versatile Video Coding (Draft 8)", Joint Video Experts Team (JVET) of ITU-T SG 16 WP 3 and ISO/IEC JTC 1/SC 29/WG 11, 17th Meeting: Brussels, BE, Jan. 7-17, 2020, Document: JVET-Q2001-vE, 510 pgs.
Elliott Karpilovsky et al., "Proposal: New Inter Modes for AV2", Document: CWG-8018 v1, Alliance for Open Media, Codec Working Group, Feb. 24, 2021, 6 pgs.
(Continued)

*Primary Examiner* — Kyle M Lotfi
(74) *Attorney, Agent, or Firm* — Morgan, Lewis & Bockius LLP

(57) ABSTRACT

The various embodiments described herein include methods and systems for encoding and decoding video. In one aspect, a method includes receiving video data comprising a plurality of blocks, including a first block, from a video bitstream. The method also includes obtaining a first syntax element from the video bitstream, the first syntax element indicating a quantity, N, of temporal motion vector predictor (TMVP) candidates for a motion vector predictor (MVP) list. The method further includes identifying a set of TMVP candidates, the set of TMVP candidates having a size less than or equal to N, and generating the MVP list using at least the set of TMVP candidates. The method also includes reconstructing the first block using the MVP list.

20 Claims, 11 Drawing Sheets

(51) Int. Cl.
  *H04N 19/129* (2014.01)
  *H04N 19/159* (2014.01)
  *H04N 19/176* (2014.01)
  *H04N 19/52* (2014.01)
  *H04N 19/70* (2014.01)

(52) U.S. Cl.
  CPC ......... *H04N 19/159* (2014.11); *H04N 19/176* (2014.11); *H04N 19/52* (2014.11); *H04N 19/70* (2014.11)

(56) References Cited

U.S. PATENT DOCUMENTS

| | | |
|---|---|---|
| 2013/0208804 A1 | 8/2013 | Lin et al. |
| 2014/0086325 A1 | 3/2014 | Chen et al. |
| 2015/0085932 A1 | 3/2015 | Lin et al. |
| 2016/0050430 A1 | 2/2016 | Xiu et al. |
| 2020/0260102 A1 | 8/2020 | Lin et al. |
| 2020/0413081 A1* | 12/2020 | Rusanovskyy ........ H04N 19/70 |
| 2021/0314588 A1* | 10/2021 | Yang ...................... H04N 19/70 |

OTHER PUBLICATIONS

Leo Zhao et al., "Advanced Motion Vector Difference Coding", Document: CWG-B092, Alliance for Open Media, Codec Working Group, Nov. 24, 2021, 7 pgs.

Leo Zhao et al., "Improved Adaptive MVD Resolution", Document: CWG-C011, Alliance for Open Media, Codec Working Group, Feb. 9, 2022, 7 pgs.

Lester (Keng-Shih) Lu et al., "Optical Flow Motion Vector Refinement for AV2", Document: CWG-B041_v3, Alliance for Open Media Codec Working Group, Google, Sep. 20, 2021, 11 pgs.

Peter de Rivaz et al., "AV1 Bitstream & Decoding Process Specification", The Alliance for Open Media, Jan. 8, 2019, 681 pgs.

Xin Zhao et al., "Tool Description for AV1 and Libaom", Document: CWG-B078_v1, Alliance for Open Media Codec Working Group, Oct. 4, 2021, 41 pgs.

Yue Chen et al., "An Overview of Core Coding Tools in the AV1 Video Codec", 2018 IEEE, 5 pgs.

Tencent Technology, ISRWO, PCT/US2023/025083, Aug. 29, 2023, 8 pgs.

* cited by examiner

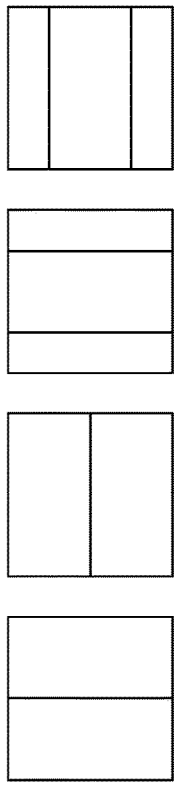
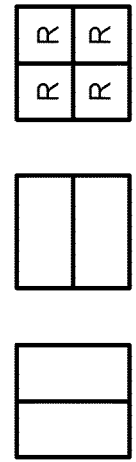
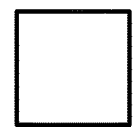
FIG. 4A
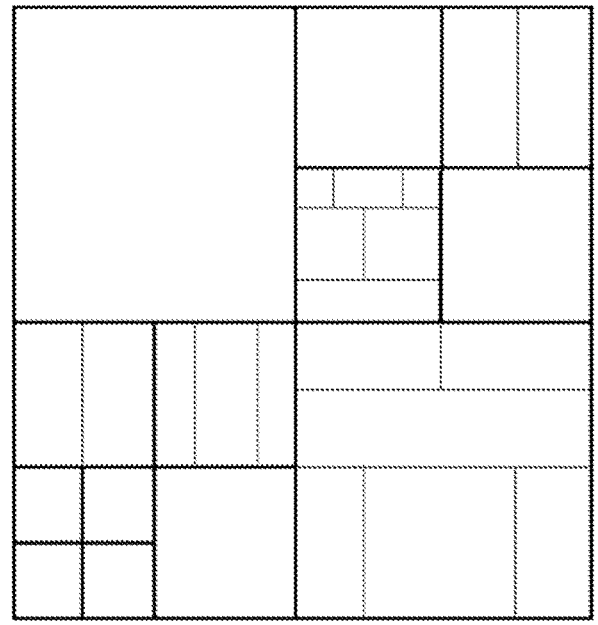
FIG. 4C
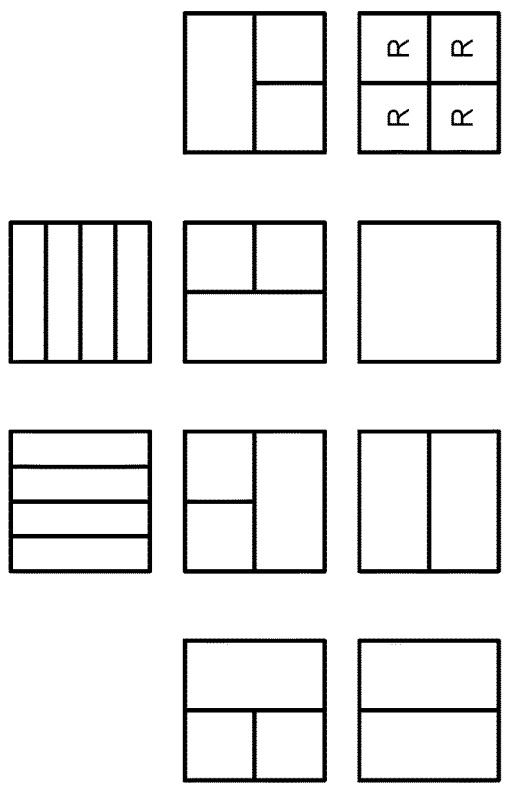
FIG. 4B
FIG. 4D

SYSTEMS AND METHODS FOR TEMPORAL MOTION VECTOR PREDICTION CANDIDATE DERIVATION

CROSS-REFERENCE TO RELATED APPLICATION

This application claims priority to U.S. Provisional Patent Application No. 63/403,642, entitled "Improved TMVP Candidates Derivation" filed Sep. 2, 2022, which is hereby incorporated by reference in its entirety.

TECHNICAL FIELD

The disclosed embodiments relate generally to video encoding and decoding, including but not limited to systems and methods for motion vector prediction candidate derivation.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

As mentioned above, a video stream can be encoded into a bitstream that involves compression and then transmission to a decoder that can decode/decompress the video stream in preparation for viewing or further processing. Compression of video streams can exploit the spatial and temporal correlation of video signals by spatial and/or motion compensated prediction. Motion compensated prediction can include inter prediction. Inter prediction can use one or more motion vectors to generate an encoded block using previously encoded and decoded pixels. A decoder receiving the encoded signal can recreate the block. As used herein, the term block may be interpreted as a prediction block, a coding block, or a coding unit (CU) depending on context.

The motion vectors used to encode/decode the video signals can be from spatially-neighboring blocks in the same frame as the block to be encoded. Additionally, the motion vectors can be from temporally-neighboring blocks (e.g., from a block in a prior frame or subsequent frame). The number of motion vector candidates is limited, e.g., for coding efficiency purposes. Conventionally, preference is given to spatial motion vectors (e.g., temporal motion vectors may be limited to 1).

In accordance with some embodiments, a method of encoding video is provided. The method includes: (i) obtaining video data comprising a plurality of blocks, including a first block; (ii) obtaining a first syntax element, the first syntax element indicating a quantity, N, of temporal motion vector predictor (TMVP) candidates for a motion vector predictor (MVP) list; (iii) identifying a set of TMVP candidates, the set of TMVP candidates having a size less than or equal to N; (iv) identifying a set of spatial MVP candidates; (v) generating the MVP list using the set of TMVP candidates and the set of spatial MVP candidates; and (vi) signaling the MVP list in a video bitstream.

In accordance with some embodiments, a method of decoding video is provided. The method includes: (i) receiving video data comprising a plurality of blocks, including a first block, from a video bitstream; (ii) obtaining a first syntax element from the video bitstream, the first syntax element indicating a quantity, N, of temporal motion vector predictor (TMVP) candidates for a motion vector predictor (MVP) list; (iii) identifying a set of TMVP candidates, the set of TMVP candidates having a size less than or equal to N; (iv) identifying a set of spatial MVP candidates; (v) generating the MVP list using the set of TMVP candidates and the set of spatial MVP candidates; and (vi) reconstructing the first block using the MVP list.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIGS. 4A-4D illustrate example coding tree structures in accordance with some embodiments.

In accordance with common practice, the various features illustrated in the drawings are not necessarily drawn to scale, and like reference numerals can be used to denote like features throughout the specification and figures.

DETAILED DESCRIPTION

The present disclosure describes, among other things, improvements to motion vector predictor derivations. The available slots for MVP candidates are limited in many video encoding processes. Due to the limited slots, many conventional processes limit insertion of temporal MVP candidates to only one candidate, which may be sub-optimal (e.g., result in a less accurate encoding/decoding). The embodiments described herein include inserting up to a predetermined number of temporal MVP candidates. The predetermined number may be based on context information and/or previously coded information.

Example Systems and Devices

Figure 1:
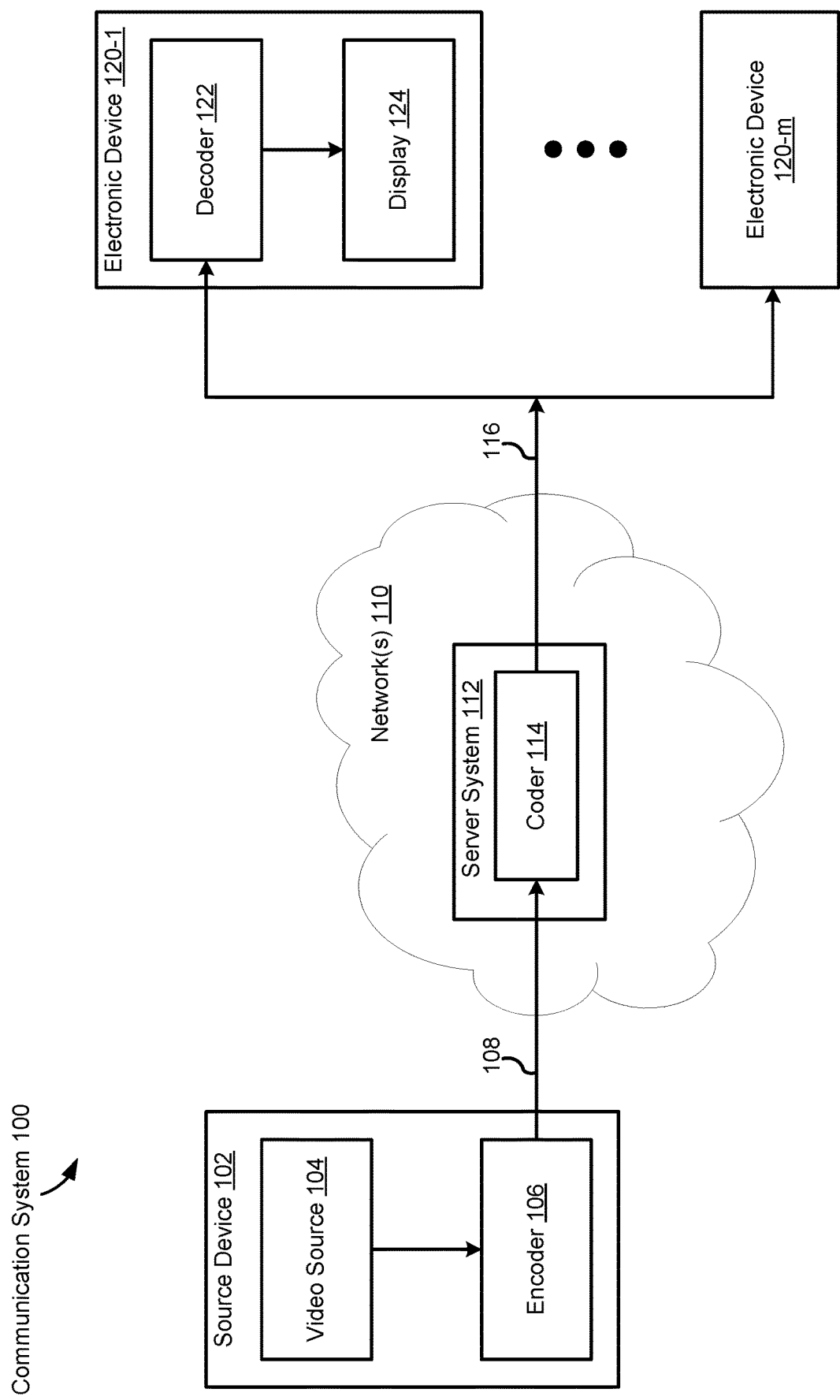
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-*m*) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video data to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 to recover and optionally display the video pictures.

In some embodiments, the transmissions discussed above are unidirectional data transmissions. Unidirectional data transmissions are sometimes utilized in in media serving applications and the like. In some embodiments, the transmissions discussed above are bidirectional data transmissions. Bidirectional data transmissions are sometimes utilized in videoconferencing applications and the like. In some embodiments, the encoded video bitstream 108 and/or the encoded video data 116 are encoded and/or decoded in accordance with any of the video coding/compressions standards described herein, such as HEVC, VVC, and/or AV1.

Figure 2A:
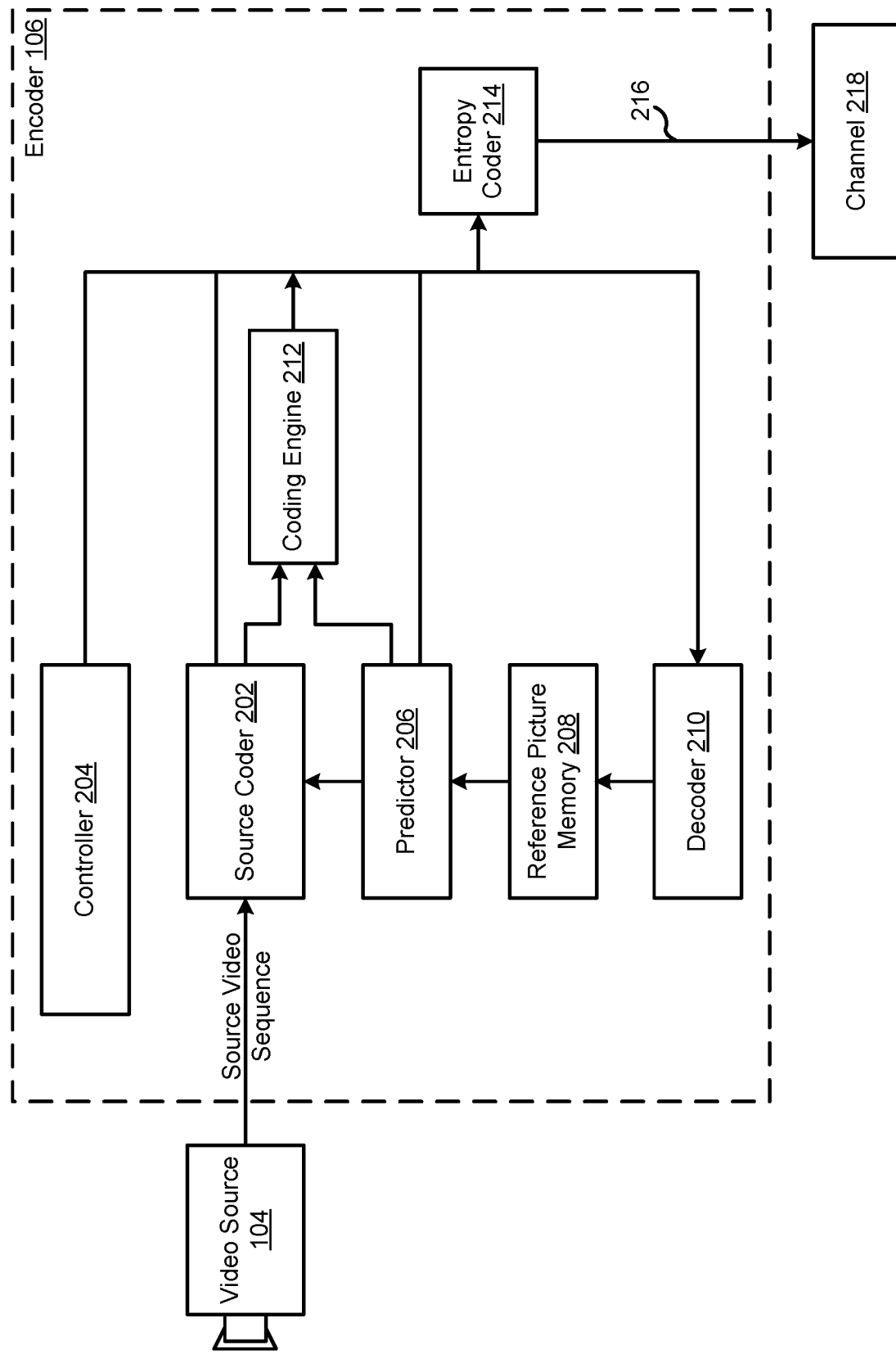
FIG. 2A is a block diagram illustrating example elements of an encoder component in accordance with some embodiments.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCb, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
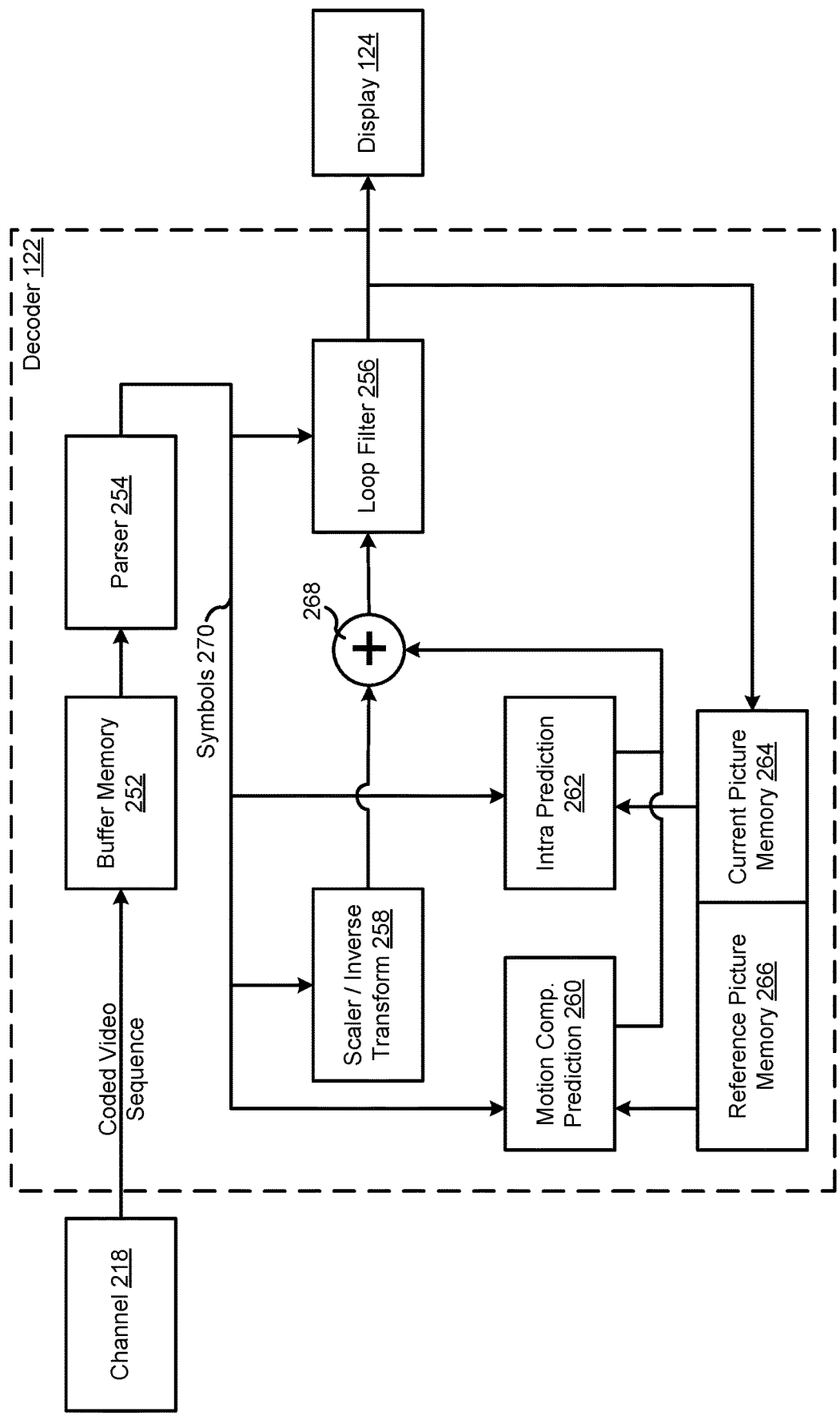
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter unit 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

Beyond the functional blocks already mentioned, decoder component 122 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is maintained.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once fully reconstructed, can be used as reference pictures for future prediction. Once a coded picture is fully reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
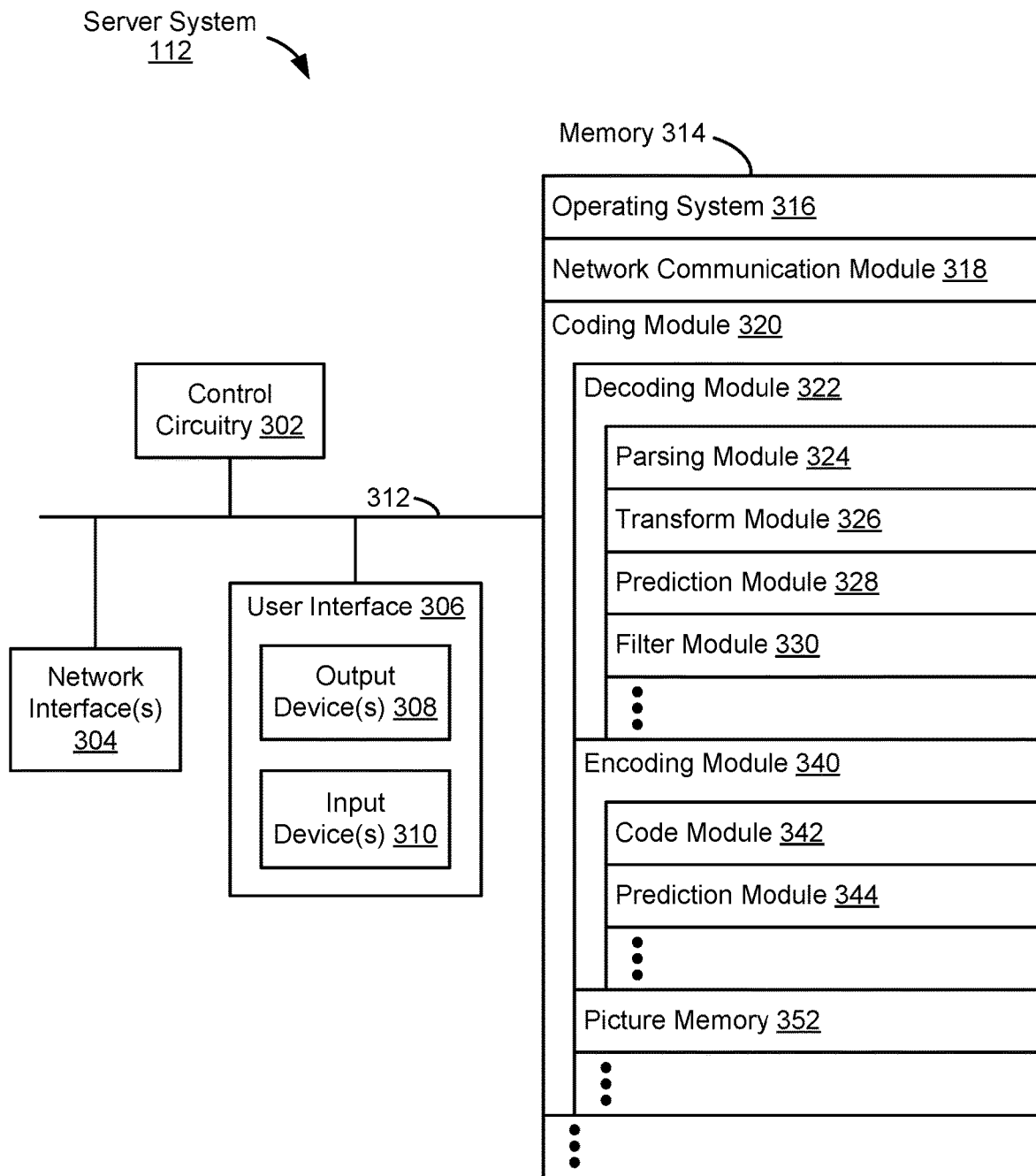
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter unit 256).

In some embodiments, the encoding module 340 includes a code module 342 (e.g., configured to perform the various functions described previously with respect to the source coder 202, the coding engine 212, and/or the entropy coder 214) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

In some embodiments, the server system 112 includes web or Hypertext Transfer Protocol (HTTP) servers, File Transfer Protocol (FTP) servers, as well as web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Approaches

FIGS. 4A-4D illustrate example coding tree structures in accordance with some embodiments. As shown in a first coding tree structure (400) in FIG. 4A, some coding approaches (e.g., VP9) use a 4-way partition tree starting from a 64×64 level down to a 4×4 level, with some additional restrictions for blocks 8×8. In FIG. 4A, partitions designated as R can be referred to as recursive in that the same partition tree is repeated at a lower scale until the lowest 4×4 level is reached.

As shown in a second coding tree structure (402) in FIG. 4B, some coding approaches (e.g., AV1) expand the partition tree to a 10-way structure and increase the largest size (e.g., referred to as a superblock in VP9/AV1 parlance) to start from 128×128. The second coding tree structure includes 4:1/1:4 rectangular partitions that are not in the first coding tree structure. The partition types with 3 sub-partitions in the second row of FIG. 4B is referred to as a T-type partition. The rectangular partitions in this tree structure cannot be further subdivided. In addition to a coding block size, coding tree depth can be defined to indicate the splitting depth from the root note. For example, the coding tree depth for the root node, e.g., 128×128, is set to 0, and after a tree block is further split once, the coding tree depth is increased by 1.

As an example, instead of enforcing fixed transform unit sizes as in VP9, AV1 allows luma coding blocks to be partitioned into transform units of multiple sizes that can be represented by a recursive partition going down by up to 2 levels. To incorporate AV1's extended coding block partitions, square, 2:1/1:2, and 4:1/1:4 transform sizes from 4×4 to 64×64 are supported. For chroma blocks, only the largest possible transform units are allowed.

As an example, a coding tree unit (CTU) may be split into coding units (CUs) by using a quad-tree structure denoted as a coding tree to adapt to various local characteristics, such as in HEVC. In some embodiments, the decision on whether to code a picture area using inter-picture (temporal) or intra-picture (spatial) prediction is made at the CU level. Each CU can be further split into one, two, or four PUs according to the PU splitting type. Inside one PU, the same prediction process is applied, and the relevant information is transmitted to the decoder on a PU basis. After obtaining the residual block by applying the prediction process based on the PU splitting type, a CU can be partitioned into TUs according to another quad-tree structure like the coding tree for the CU. One of the key features of the HEVC structure is that it has multiple partition concepts including CU, PU, and TU. In HEVC, a CU or a TU can only be a square shape, while a PU may be a square or rectangular shape for an inter predicted block. In HEVC, one coding block may be further split into four square sub-blocks, and a transform is performed on each sub-block (TU). Each TU can be further split recursively (using quad-tree split) into smaller TUs, which is called Residual Quad-Tree (RQT). At a picture boundary, such as in HEVC, implicit quad-tree split may be employed so that a block will keep quad-tree splitting until the size fits the picture boundary.

A quad-tree with nested multi-type tree using binary and ternary splits segmentation structure, such as in VVC, may replace the concepts of multiple partition unit types, e.g., it removes the separation of the CU, PU, and TU concepts except as needed for CUs that have a size too large for the maximum transform length, and supports more flexibility for CU partition shapes. In the coding tree structure, a CU can have either a square or rectangular shape. ACTU is first partitioned by a quaternary tree (also referred to as quadtree) structure. The quaternary tree leaf nodes can be further partitioned by a multi-type tree structure. As shown in a third coding tree structure (404) in FIG. 4C, the multi-type tree structure includes four splitting types. For example, the multi-type tree structure includes vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called CUs, and unless the CU is too large for the maximum transform length, this segmentation is used for prediction and transform processing without any further partitioning. This means that, in most cases, the CU, PU, and TU have the same block size in the quad-tree with nested multi-type tree coding block structure. An exception occurs when a maximum supported transform length is smaller than the width or height of the color component of the CU. An example of block partitions for one CTU (406) is shown in FIG. 4D, which illustrates an example quadtree with nested multi-type tree coding block structure.

A maximum supported luma transform size may be 64×64 and the maximum supported chroma transform size may be 32×32, such as in VVC. When the width or height of the CB is larger than the maximum transform width or height, the CB is automatically split in the horizontal and/or vertical direction to meet the transform size restriction in that direction.

The coding tree scheme supports the ability for the luma and chroma to have a separate block tree structure, such as in VTM7. In some cases, for P and B slices, the luma and chroma CTBs in one CTU share the same coding tree structure. However, for I slices, the luma and chroma can have separate block tree structures. When a separate block tree mode is applied, a luma CTB is partitioned into CUs by one coding tree structure, and the chroma CTBs are partitioned into chroma CUs by another coding tree structure. This means that a CU in an I slice may include, or consist of, a coding block of the luma component or coding blocks of two chroma components, and a CU in a P or B slice may always include, or consist of, coding blocks of all three-color components unless the video is monochrome.

In order to support the extended coding block partitions, multiple transform sizes (e.g., ranging from 4-point to 64-point for each dimension) and transform shapes (e.g., square or rectangular with width/height ratio's 2:1/1:2 and 4:1/1:4) may be utilized, such as in AV1.

In a merge mode, implicitly derived motion information can be directly used for prediction sample generation of a current CU. A merge mode with motion vector differences (MMVD) was introduced in VVC. A MMVD flag can be signalled right after sending a skip flag and merge flag to specify whether MMVD mode is used for the CU. In MMVD, after a merge candidate is selected, it may be further refined by the signalled MVDs information. The MVDs information may include a merge candidate flag, an index to specify motion magnitude, and an index for indication of motion direction. In the merge mode, one of the first two merge candidate flags in the merge list can be used as a motion vector (MV) basis. The merge candidate flag can be signaled to specify which flag is used.

Figure 5A:
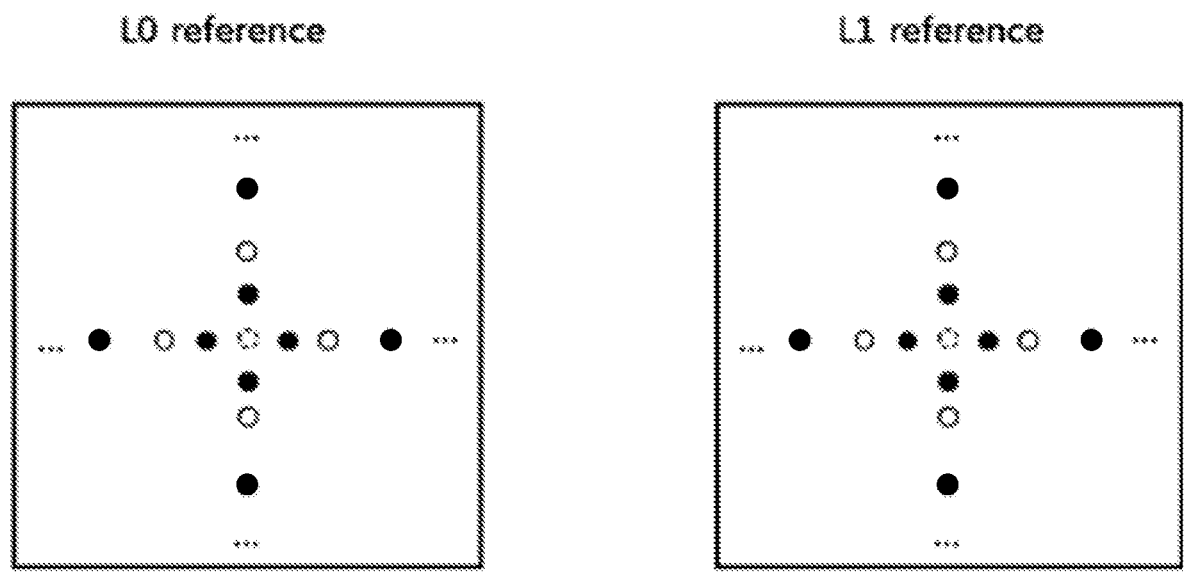
FIG. 5A illustrates an MMDV search point of two reference frames in accordance with some embodiments.

A distance index specifies the motion magnitude information and indicates a pre-defined offset from the starting point. FIG. 5A illustrates an MMDV search point of two reference frames in accordance with some embodiments. As shown in FIG. 5A, an offset may be added to either horizontal components or vertical components of a starting MV. The relation between the distance index and the pre-defined offset is specified in Table 1 below.

TABLE 1

Distance index and corresponding offsets

| Distance IDX | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

A direction index represents the direction of the MVD relative to the starting point. The direction index may represent one of the four directions, as shown in Table 2 below. The meaning of the MVD sign may be variant according to the information of the starting MVs. When the starting MVs are uni-prediction MVs or bi-prediction MVs with both lists pointing to the same side of a current picture (e.g., POCs of two references are both larger than the POC of the current picture, or the POCs of the two references are both smaller than the POC of the current picture), the sign in Table 2 specifies the sign of an MV offset added to the starting MV. When the starting MVs are bi-prediction MVs with the two MVs pointing to the different sides of the current picture (e.g., the POC of one reference is larger than the POC of the current picture, and the POC of the other reference is smaller than the POC of the current picture), and the difference of the POC in list 0 (L0) is greater than the one in list 1 (L1), the sign in Table 2 specifies the sign of the MV offset added to the L0 MV component of the starting MV and the sign for the L1 MV has the opposite value. If the difference of the POC in L1 is greater than L0, the sign in Table 2 specifies the sign of the MV offset added to the L1 MV component of the starting MV and the sign for the L0 MV has the opposite value.

In some embodiments, the MVD is scaled according to the difference of POCs in each direction. For example, if the differences of POCs in both lists are the same, no scaling is needed. If the difference of POC in L0 is larger than the one of L1, the MVD for L1 is scaled. If the POC difference of L1 is greater than L0, the MVD for L0 is scaled in the same way. If the starting MV is uni-predicted, the MVD is added to the available MV.

TABLE 2

Sign of MV offset specified by direction index

| Direction IDX | 00 | 01 | 10 | 11 |
|---|---|---|---|---|
| x-axis | + | − | N/A | N/A |
| y-axis | N/A | N/A | + | − |

As an example, in VVC, besides the normal unidirectional prediction and bi-directional prediction mode MVD signalling, symmetric MVD mode for bi-directional MVD signalling may be applied. In the symmetric MVD mode, motion information including reference picture indices of both L0 and L1 and MVD of L1 may be derived (not signaled).

The decoding process of the symmetric MVD mode may be as follows. First, at the slice level, variables BiDirPredFlag, RefIdxSymL0 and RefIdxSymL1 are derived. For example, if the mvd_l1_zero_flag is 1, then BiDirPredFlag is set equal to 0. If the nearest reference picture in L0 and the nearest reference picture in L1 form a forward and backward pair of reference pictures or a backward and forward pair of reference pictures, then BiDirPredFlag is set to 1, and both L0 and L1 reference pictures are short-term reference pictures. Otherwise, BiDirPredFlag is set to 0. Second, at the CU level, a symmetrical mode flag indicating whether symmetrical mode is used or not is explicitly signaled if the CU is bi-prediction coded and BiDirPredFlag is equal to 1. When the symmetrical mode flag is true (e.g., equal to 1), only mvp_l0_flag, mvp_l1_flag, and MVD0 are explicitly signaled. The reference indices for L0 and L1 are set equal to the pair of reference pictures, respectively. Lastly, MVD1 is set equal to (−MVD0).

In some embodiments, for each coded block in an inter frame, if the mode of the current block is not skip mode but inter-coded mode, then another flag is signaled to indicate whether single reference mode or compound reference mode is used for the current block. A prediction block may be generated by one motion vector in single reference mode. In compound reference mode, the prediction block is generated by a weighted averaging of two prediction blocks derived from two motion vectors. Modes that may be signaled for a single reference case are detailed in Table 3 below.

TABLE 3

Single Reference Modes

| Modes | Description |
|---|---|
| NEARMV | use one of the MVPs in the list indicated by a Dynamic Reference List (DRL) index. |
| NEWMV | use one of the MVPs in the list signaled by a DRL index as reference and apply a delta to the MVP. |
| GLOBALMV | use a motion vector based on frame-level global motion parameters. |

Modes that may be signaled for a compound reference case are detailed in Table 4 below.

TABLE 4

Compound Reference Modes

| Modes | Description |
|---|---|
| NEAR_NEARMV | use one of the MVPs in the list signaled by a DRL index. |
| NEAR_NEWMV | use one of the MVPs in the list signaled by a DRL index as reference and send a delta MV for the second MV. |
| NEW_NEARMV | use one of the MVPs in the list signaled by a DRL index as reference and send a delta MV for the first MV. |
| NEW_NEWMV | use one of the MVPs in the list signaled by a DRL index as reference and send a delta MV for both MVs |
| GLOBAL_GLOBALMV | use MVs from each reference based on their frame-level global motion parameters. |

Some standards, such as AV1, allow for ⅛-pixel motion vector precision (or accuracy). Syntaxes may be used to signal the motion vector difference in reference frame list zero (L0) or list one (L1) as follows. For example, syntax mv_joint specifies which components of the motion vector difference are non-zero. Syntax mv_joint value of 0 indicates there is no non-zero MVD along either horizontal or vertical direction, value of 1 indicates there is non-zero MVD only along horizontal direction, value of 2 indicates there is non-zero MVD only along vertical direction, and value of 3 indicates there is non-zero MVD along both horizontal and vertical direction. Syntax mv_sign specifies whether a motion vector difference is positive or negative. Syntax mv_class specifies the class of the motion vector difference. As shown in Table 5 below, a higher class means that the motion vector difference has a larger magnitude. Syntax mv_bit specifies the integer part of the offset between the motion vector difference and a starting magnitude of each MV class. Syntax mv_fr specifies the first two fractional bits of the motion vector difference. Syntax mv_hp specifies the third fractional bit of the motion vector difference.

TABLE 5

Motion Vector Class and Magnitude

| MV class | Magnitude of MVD |
|---|---|
| MV_CLASS_0 | (0, 2] |
| MV_CLASS_1 | (2, 4] |
| MV_CLASS_2 | (4, 8] |
| MV_CLASS_3 | (8, 16] |
| MV_CLASS_4 | (16, 32] |
| MV_CLASS_5 | (32, 64] |
| MV_CLASS_6 | (64, 128] |
| MV_CLASS_7 | (128, 256] |
| MV_CLASS_8 | (256, 512] |
| MV_CLASS_9 | (512, 1024] |
| MV_CLASS_10 | (1024, 2048] |

For NEW_NEARMV and NEAR_NEWMV modes (shown in Table 4 above), the precision of the MVD depends on the associated class and the magnitude of MVD. For example, fractional MVD is allowed only if MVD magnitude is equal to or less than one-pixel. Additionally, only one MVD value is allowed when the value of the associated MV class is equal to or greater than MV_CLASS_1, and the MVD value in each MV class is derived as 4, 8, 16, 32, 64 for MV class 1 (MV_CLASS_1), 2 (MV_CLASS_2), 3 (MV_CLASS_3), 4 (MV_CLASS_4), or 5 (MV_CLASS_5). The allowed MVD values in each MV class are shown in Table 6 below.

TABLE 6

Allowed MVD Per MV Class

| MV class | Magnitude of MVD |
|---|---|
| MV_CLASS_0 | (0, 1], {2} |
| MV_CLASS_1 | {4} |
| MV_CLASS_2 | {8} |
| MV_CLASS_3 | {16} |
| MV_CLASS_4 | {32} |
| MV_CLASS_5 | {64} |
| MV_CLASS_6 | {128} |
| MV_CLASS_7 | {256} |
| MV_CLASS_8 | {512} |
| MV_CLASS_9 | {1024} |
| MV_CLASS_10 | {2048} |

In some embodiments, if the current block is coded using NEW_NEARMV or NEAR_NEWMV mode, one context is used for signaling mv_joint or mv_class. If the current block is not coded using NEW_NEARMV or NEAR_NEWMV mode, another context is used for signaling mv_joint or mv_class.

An inter coded mode, JOINT_NEWMV, may be applied to indicate whether the MVDs for two reference lists are jointly signaled. If the inter prediction mode is equal to JOINT_NEWMV mode, the MVDs for reference L0 and reference L1 are jointly signaled. As such, only one MVD, named as joint_mvd, may be signaled and transmitted to a decoder, and delta MVs for reference L0 and reference L1 may be derived from joint_mvd. JOINT_NEWMV mode is signaled together with NEAR_NEARMV, NEAR_NEWMV, NEW_NEARMV, NEW_NEWMV, and GLOBAL_GLOBALMV mode.

When JOINT_NEWMV mode is signaled, and the picture order count (POC) distance between two reference frames and a current frame are different, MVD is scaled for reference L0 or reference L1 based on the POC distance. For example, the distance between reference frame L0 and the current frame is noted as td0 and the distance between reference frame L1 and the current frame is noted as td1. If td0 is equal to or larger than td1, then joint_mvd is directly used for reference L0 and the mvd for reference L1 is derived from joint_mvd based on Equation 1 below.

Derived MVD from Joint MVD for $td0 > td1$ $$\text{derived\_mvd} = \frac{td1}{td0} * \text{joint\_mvd} \qquad \text{Equation 1}$$

If td1 equal to or larger than td0, then joint_mvd is directly used for reference L1 and the mvd for reference L0 is derived from joint_mvd based on Equation 2 below.

Derived MVD from Joint MVD for $td0 < td1$ $$\text{derived\_mvd} = \frac{td0}{td1} * \text{joint\_mvd} \qquad \text{Equation 2}$$

An inter coded mode, AMVDMV, may be added to the single reference case. When AMVDMV mode is selected, it indicates that adaptive MVD resolution (AMVD) is applied to the signal MVD. A flag, for example, amvd_flag may be added under JOINT_NEWMV mode to indicate whether AMVD is applied to joint MVD coding mode or not. When adaptive MVD resolution is applied to joint MVD coding mode, named as joint AMVD coding, MVD for two reference frames are jointly signaled and the precision of MVD is implicitly determined by MVD magnitudes. MVD for two (or more than two) reference frames are jointly signaled, and MVD coding is applied.

In AMVR, initially proposed in CWG-0012, a total of seven MV precisions (8, 4, 2, 1, ½, ¼, ⅛) are supported. For each prediction block, AVM encoder searches all the supported precision values and signals the best precision to the decoder. To reduce the encoder run-time, two precision sets are supported. Each precision set contains 4-predefined precisions. The precision set is adaptively selected at the frame level based on the value of maximum precision of the frame. Similar to AV1, the maximum precision is signaled in the frame header. Table 7 summarizes the supported precision values based on the frame level maximum precision.

TABLE 7

MV Precision per Frame Level Precision

| Frame level maximum precision | Supported MV precisions |
|---|---|
| ⅛ | ⅛, ½, 1, 4 |
| ¼ | ¼, 1, 4, 8 |

In AOM video model (AVM), similar to AV1, there is a frame level flag to indicate if the MVs of the frame contain sub-pel precisions or not. The AMVR is enabled only if the value of cur_frame_force_integer_mv_flag is 0. In the AMVR, if precision of the block is lower than the maximum precision, motion model and interpolation filters are not signaled. If the precision of a block is lower than the maximum precision, motion mode is inferred to translation motion and an interpolation filter is inferred to a REGULAR interpolation filter. Similarly, if the precision of the block is either 4-pel or 8-pel, inter-intra mode is not signaled and inferred to be 0.

Some embodiments include the spatial motion vector predictor (SMVP), temporal motion vector predictor (TMVP), extra MV candidate(s), derived MVP(s), and/or reference bank MVPs. For example, a stack with fixed size (e.g., an MVP list) may be generated both at the encoder and decoder side to store the MVPs.

Figure 5B:
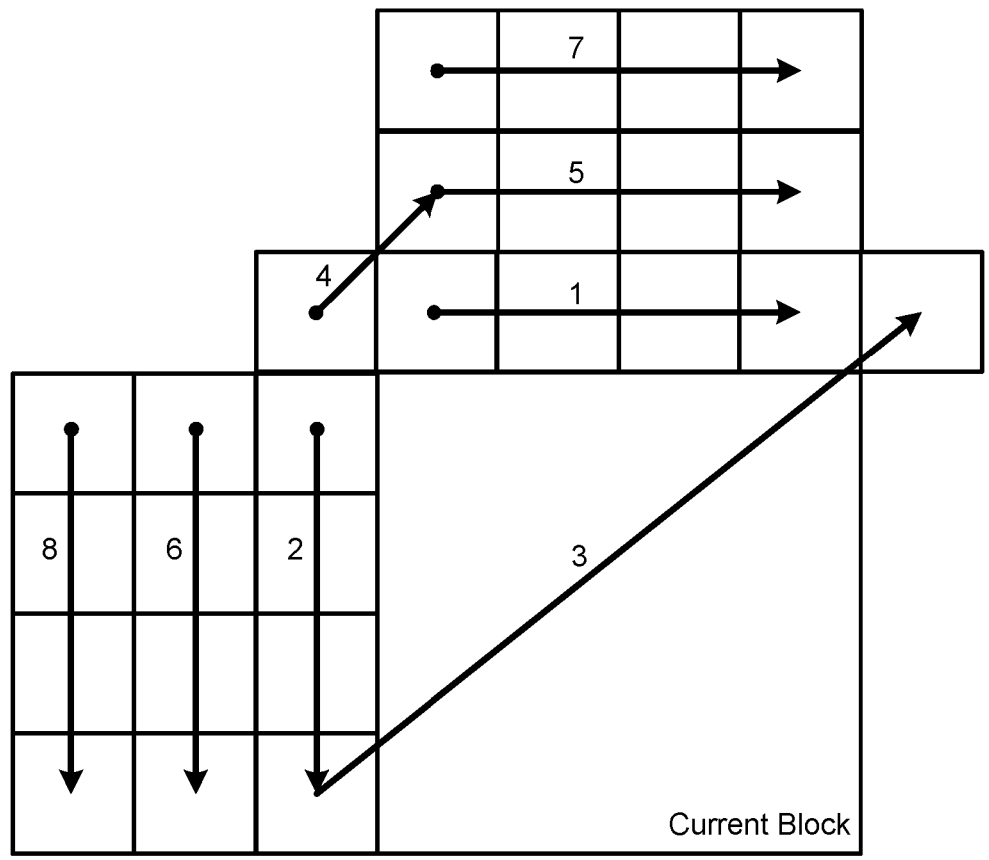
FIG. 5B illustrates example spatial neighbouring motion candidates for motion vector prediction in accordance with some embodiments.

Spatial motion vector predictors are derived from spatial neighboring blocks, including adjacent spatial neighboring blocks, which are direct neighbors of the current block to the top and left sides, as well as non-adjacent spatial neighboring blocks, which are close to, but not directly adjacent to the current block. An example of a set of spatial neighboring blocks for a luma block is illustrated in FIG. 5B (e.g., where each spatial neighboring block is an 8×8 block).

The spatial neighboring blocks may be examined to find one or more MVs that are associated with the same reference frame index as the current block. As an example for a current block, the search order of spatial neighboring 8×8 luma blocks is as indicated by the numbers 1-8 in FIG. 5B. In some embodiments, less spatial neighboring blocks are scanned (e.g., numbers 5 and 7 are skipped). In this example, first the top adjacent row is checked from left to right. Second, the left adjacent column is checked from top to bottom. Third, the top-right neighboring block is checked. Fourth, the top-left block neighboring block is checked. Fifth, the first top non-adjacent row is checked from left to right. Sixth, the first left non-adjacent column is checked from top to bottom. Seventh, the second top non-adjacent row is checked from left to right. Eighth, the second left non-adjacent column is checked from top to bottom.

In some embodiments, the adjacent candidates (e.g., numbers 1-3 in FIG. 5B) are first put into the MV predictor list before TMVP candidates. In some embodiments, the non-adjacent (e.g., numbers 4-8 in FIG. 5B) are put into the MV predictor list after TMVP candidates. In this example, all the SMVP candidates should have a same reference picture as the current block. If the current block has a single reference picture, the MVP candidate with a single reference picture should have the same reference picture. For a block with compound reference pictures (e.g., 2 reference pictures), one of the reference pictures should be the same reference picture as the current block. If the current block has two reference pictures, only an MVP candidate with both of the same reference pictures is added to the MVP list.

In addition to spatial neighboring blocks, MV predictors known as temporal MV predictors can also be derived using collocated blocks in reference frames. For example, to generate temporal MV predictors, the MVs of reference frames are stored with reference indices associated with the respective reference frames. Thereafter, for each 8×8 block of the current frame, the MVs of a reference frame whose trajectories pass through the 8×8 block are identified and stored with the reference frame index in a temporal MV buffer. For example, for inter prediction using a single reference frame, regardless of whether the reference frame is a forward or backward reference frame, the MVs are stored in 8×8 units for performing the temporal motion vector prediction of a future frame. As another example, for compound inter prediction, only the forward MVs are stored in 8×8 units for performing the temporal motion vector prediction of a future frame.

Figure 5C:
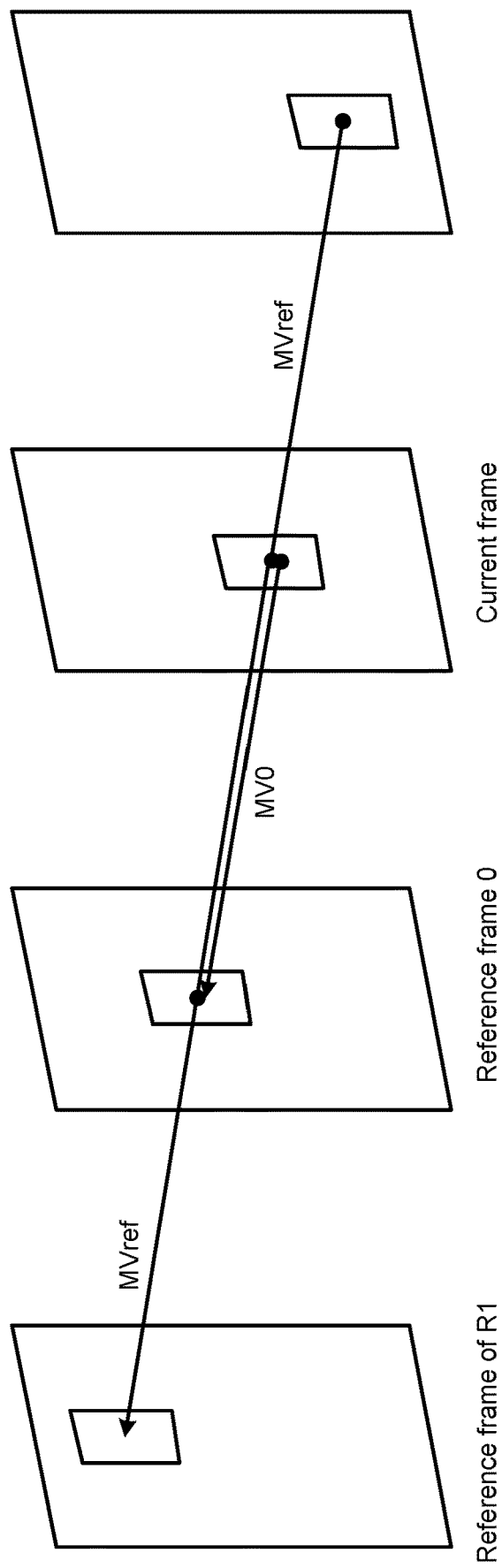
FIG. 5C illustrates example temporal neighbouring motion candidates for motion vector prediction in accordance with some embodiments.

FIG. 5C illustrates example temporal neighboring motion candidates for motion vector prediction in accordance with some embodiments. In the example of FIG. 5C, the MV of reference frame 1 (R1), MVref, points from R1 to a reference frame of R1. In doing so, MVref passes through an 8×8 block of the current frame. MVref can be stored in the temporal MV buffer associated with this 8×8 block. During a motion projection process for deriving the temporal MV predictor, the reference frames can be scanned in a predefined order, e.g., LAST_FRAME, BWDREF_FRAME, ALTREF_FRAME, ALTREF2_FRAME, and LAST2_FRAME. As an example, the MVs from a higher indexed reference frame in scanning order may not replace the previously identified MVs assigned by a lower indexed reference frame in scanning order.

Given predefined block coordinates, the associated MVs stored in the temporal MV buffer can be identified and projected on to the current block to derive a temporal MV predictor that points from the current block to its reference frame, e.g., MV0 in FIG. 5C.

Figure 5D:
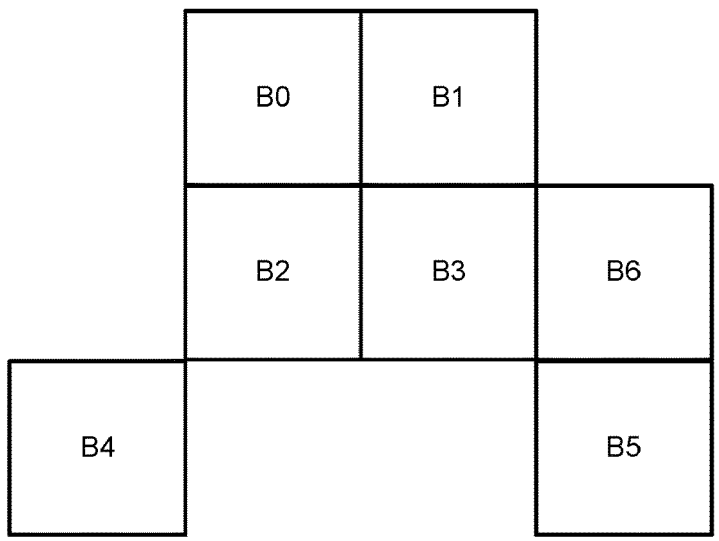
FIG. 5D illustrates example block positions for deriving temporal motion vector predictors in accordance with some embodiments.

FIG. 5D illustrates example block positions for deriving temporal motion vector predictors in accordance with some embodiments. In FIG. 5D, predefined block positions for deriving temporal MV predictors of a 16×16 block are shown. For example, up to seven blocks are checked for valid temporal MV predictors. The temporal MV predictors may be checked after the adjacent spatial MV predictors but before the non-adjacent spatial MV predictors (discussed previously with respect to FIG. 5B).

In FIG. 5D, B0, B1, B2, and B3 may be referred to as inner TMVP blocks whereas B4, B5, and B6 may be referred to as outside TMVP blocks. In some embodiments, inner TMVP blocks are checked before outside TMVP blocks. For example, the scanning order for the TMVP positions in FIG. 5D may be as follows: B0→B1→B2→B3→B4→B5→B6.

For the derivation of MV predictors, all the spatial and temporal MV candidates can be pooled, and each predictor may be assigned a weight that is determined during the scanning of the spatial and temporal neighboring blocks. Based on the associated weights, the candidates can be sorted and ranked. As an example, up to four candidates are identified and added to an MV predictor list. This list of MV predictors is sometimes also referred to as a dynamic reference list (DRL), and can be used in dynamic MV prediction modes. If the MVP list is not full after scanning the spatial and temporal candidates, an extra search may be performed, and the extra MVP candidates can be used to fill the MVP list. For example, the extra MVP candidates may include global MV, zero MV, combined compound MVs without scaling, and the like.

In some embodiments, the adjacent SMVP candidates, TMVP candidates, and/or non-adjacent SMVP candidates that are added in the MVP list are reordered. For example, the reordering process may be based on a weight given to each candidate. The weight of a candidate may be predefined based on an overlapping area of the current block and the candidate blocks. In some embodiments, the weighting of non-adjacent (outer) SMVP candidates and TMVP candidates are not considered during the reordering process (e.g., the reordering process only affects adjacent candidates).

Figure 5E:
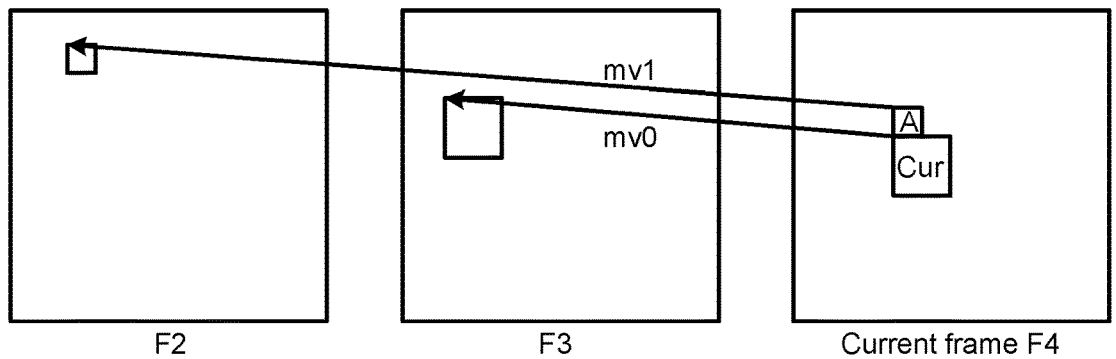
FIG. 5E illustrates example motion vector candidate generation for a single inter prediction block in accordance with some embodiments.

The derived MVP candidates may contain both derived MVP for single reference picture and a compound mode. For a single inter prediction, if the reference frame of neighboring block is different from the one of current block, but they are in the same direction, then a temporal scaling algorithm can be utilized to scale the MV to that reference frame in order to form an MVP for the motion vector of current block. FIG. 5E illustrates example motion vector candidate generation for a single inter prediction block in accordance with some embodiments. As shown in FIG. 5E, the mv1 from the neighboring block, A, is utilized to derive the MVP for the motion vector, mv0, of current block with temporal scaling.

Figure 5F:
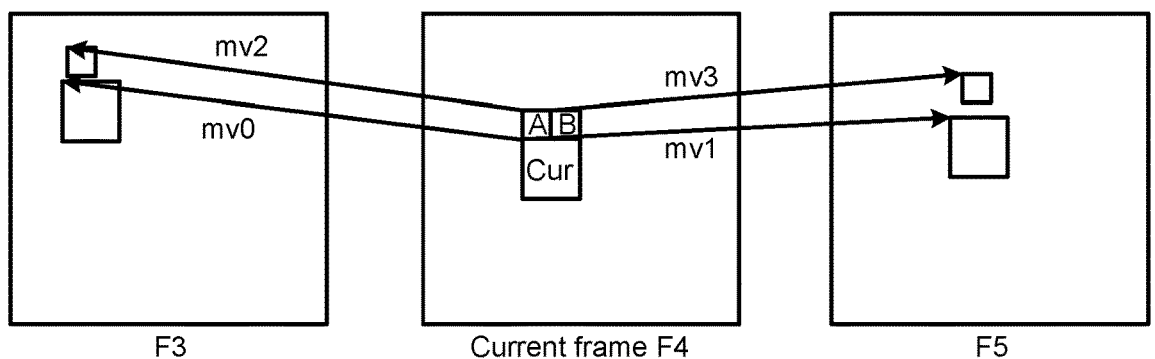
FIG. 5F illustrates example motion vector candidate generation for a compound prediction block in accordance with some embodiments.

For compound inter prediction, the composed MVs from different neighboring blocks are exploited to derive an MVP of the current block, but the reference frames of the composed MVs need to be the same as current block. FIG. 5F illustrates example motion vector candidate generation for a compound prediction block in accordance with some embodiments. As shown in FIG. 5F, the composed MV (mv2, mv3) have the same reference frames as the current block but are from different neighboring blocks.

Figure 5G:
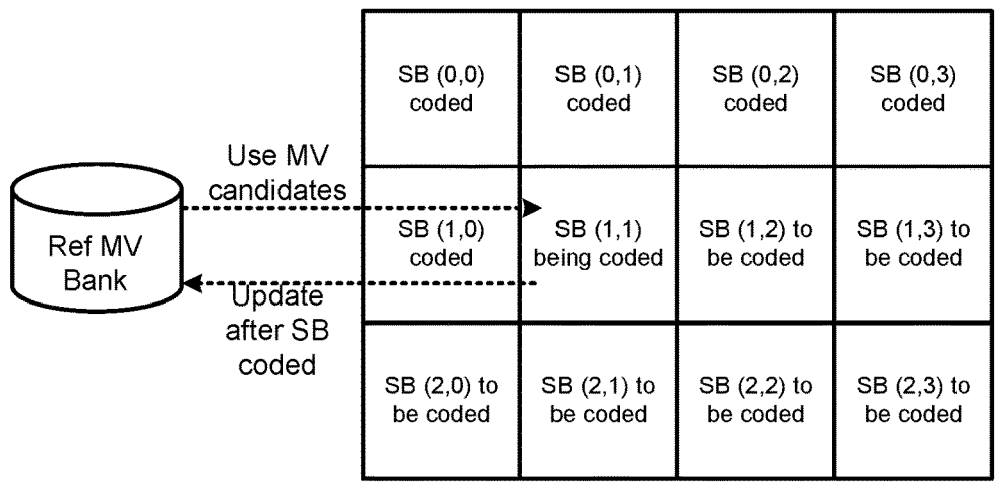
FIG. 5G illustrates example motion vector candidate bank processing in accordance with some embodiments.

Some embodiments include a reference motion vector candidate bank as illustrated in FIG. 5G. For example, each buffer corresponds to a unique reference frame type, corresponding to a single or a pair of reference frames, covering single and compound inter modes respectively. In some embodiments, all the buffers are the same size. In some embodiments, when a new MV is added to a buffer that is full, an existing MV is evicted to make room for the new one.

Coding blocks can refer to the MV candidate bank to collect reference MV candidates, e.g., in addition to the ones obtained with the reference MV list generation described previously. For example, after coding a superblock, the MV bank is updated with the MVs used by the coding blocks of the superblock. Each tile may have an independent MV reference bank that is utilized by all superblocks within the tile. For example, at the beginning of encoding each tile, the corresponding bank is emptied. Thereafter, while coding each superblock within that tile, MVs from the bank may be used as MV reference candidates. At the end of encoding a superblock, the bank is updated.

FIG. 5G illustrates example motion vector candidate bank processing in accordance with some embodiments. As shown in FIG. 5G, the bank updating process may be based on a superblock. For example, after a superblock is coded, the first (e.g., up to 64) candidate MVs used by each coding block inside the superblock are added to the bank. A pruning process may also be involved during the updating.

After the reference MV candidate scanning is performed as described previously, if there are open slots in the candidate list, the system may reference the MV candidate bank (e.g., in the buffer with matching reference frame type) for additional MV candidates. For example, going from the end backwards to the start of the buffer, the MV in the bank buffer is appended to the candidate list if it does not already exist in the list.

Figure 5H:
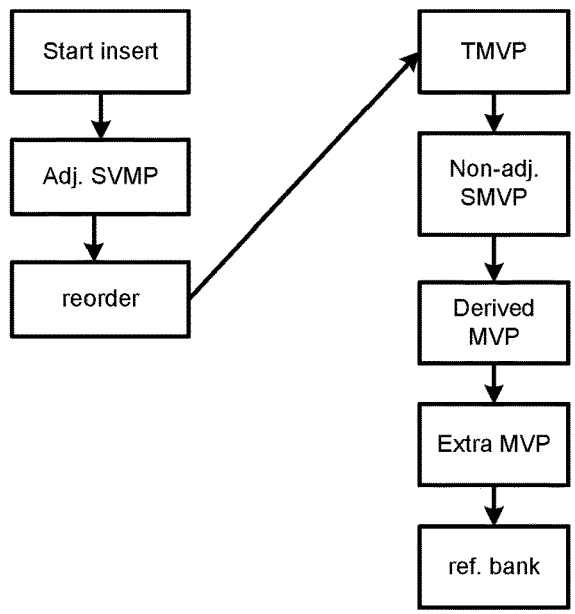
FIG. 5H illustrates an example motion vector predictor list construction order in accordance with some embodiments.
Figure 5I:
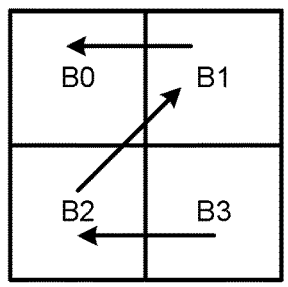
FIG. 5I illustrates an example scan order for motion vector predictor candidate blocks in accordance with some embodiments.

FIG. 5H illustrates an example motion vector predictor list construction order in accordance with some embodiments. In the example of FIG. 5H, the MVP list is constructed by the following order (e.g., with pruning): (i) adjacent SMVP candidates, (ii) reordering process for the existing candidates, (iii) TMVP candidates, (iv) non-adjacent SMVP candidates, (v) derived candidates, (vi) extra MVP candidates, and (vii) candidates from reference MV candidate bank. In some embodiments, only 1 TMVP candidate can be added into MVP candidate list. For example, once 1 TMVP candidate is added into MVP list, the remaining TMVP candidate blocks are skipped. In some embodiments, a reversed horizontal scan order is used to check the inner TMVP candidates. An example is shown in FIG. 5I, where the scanning order for inner TMVP candidates are B3→B2→B1→B0. In some embodiments, the outside TMVP candidates are not scanned. For example, B4, B5, and B6 in FIG. 5D are not scanned.

In some embodiments, skip mode motion information fetching of spatial neighboring blocks contains both reference picture indices and motion vectors. The information fetching may include: (i) inserting the MVs from the adjacent spatial neighboring blocks; (ii) inserting temporal motion vector predictors from the reference picture; (iii) inserting the MV from the non-adjacent spatial neighboring blocks; (iv) sorting the MV candidates from the adjacent spatial neighboring blocks; (v) inserting composite MVs when existing list size is less than a predetermined threshold (e.g., less than 2 or 3); and/or (vi) inserting the MVs from reference MV bank. The temporal motions vectors and MVs from the reference MV bank may use the preselected reference picture. For example, the pruning process may take the reference picture index into account.

The slots for MVP candidates are limited to four in existing processes, e.g., AV2. Moreover, at most one TMVP may be inserted into MVP list regardless of the MVP list length, which may lead to loss of accuracy in the encoding/decoding processes.

Figure 6A:
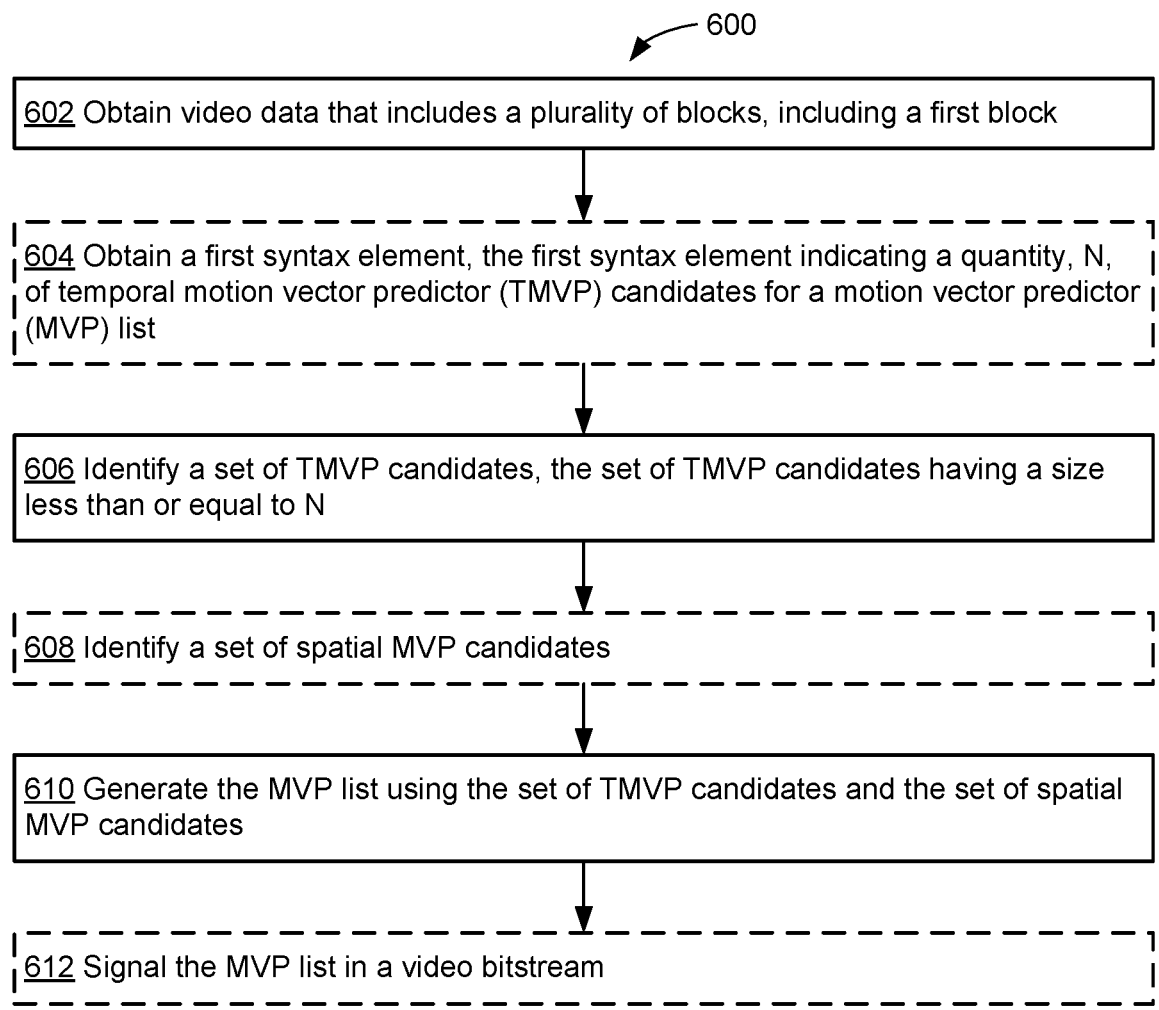
FIG. 6A is a flow diagram illustrating an example method of encoding video in accordance with some embodiments.

FIG. 6A is a flow diagram illustrating a method 600 of encoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system obtains (602) video data that includes a plurality of blocks, including a first block. In some embodiments, the system obtains (604) a first syntax element, the first syntax element indicating a quantity, N, of temporal motion vector predictor (TMVP) candidates for a motion vector predictor (MVP) list. In some embodiments, the quantity, N, of TMVP candidates is set to a default value. The system identifies (606) a set of TMVP candidates, the set of TMVP candidates having a size less than or equal to N. In some embodiments, the system identifies (608) a set of spatial MVP candidates. The system generates (610) the MVP list using the set of TMVP candidates and the set of spatial MVP candidates. In some embodiments, the system signals (612) the MVP list in a video bitstream.

Figure 6B:
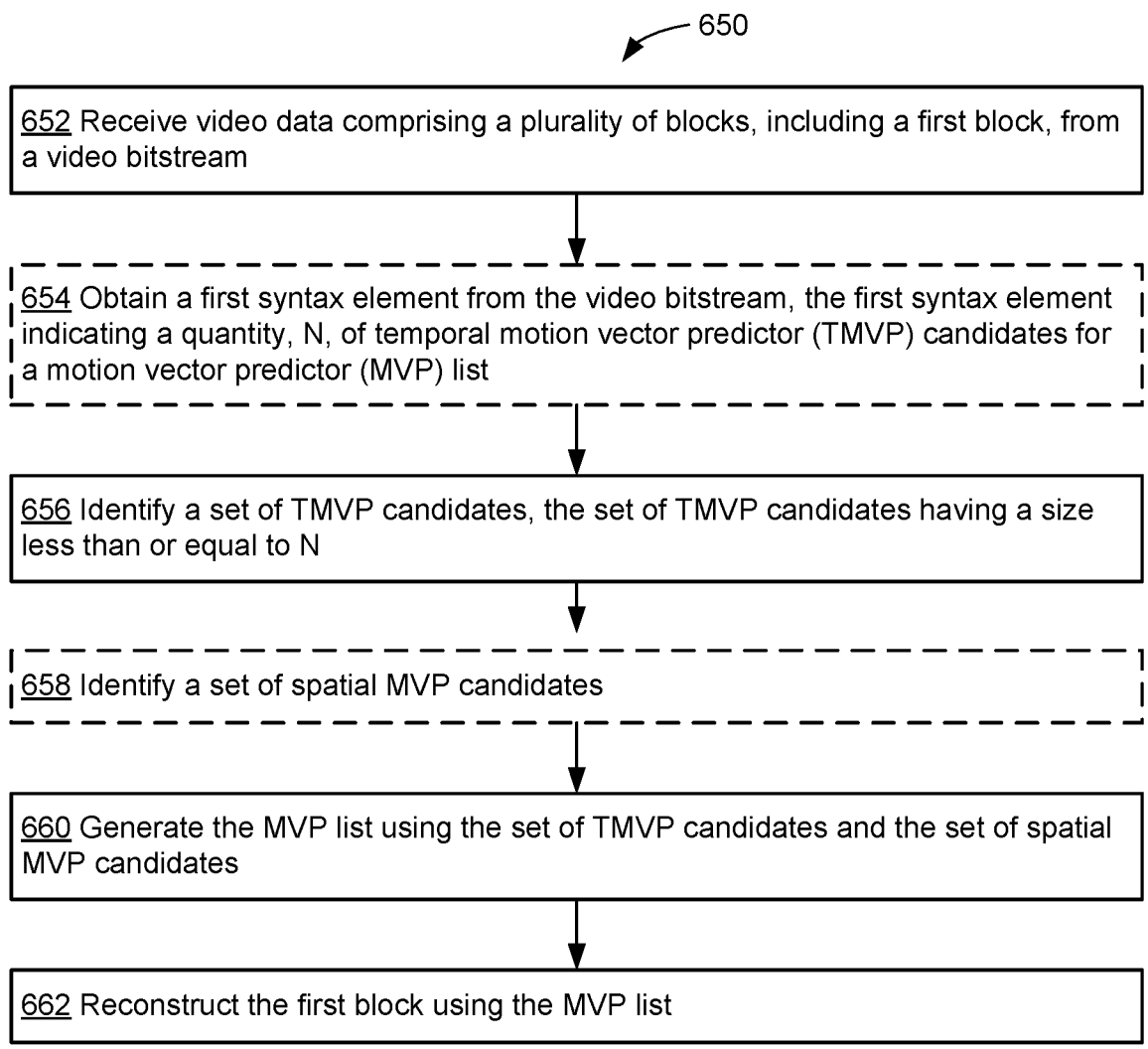
FIG. 6B is a flow diagram illustrating an example method of decoding video in accordance with some embodiments.

FIG. 6B is a flow diagram illustrating a method 650 of decoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system.

The system receives (652) video data comprising a plurality of blocks, including a first block, from a video bitstream. In some embodiments, the system obtains (654) a first syntax element from the video bitstream, the first syntax element indicating a quantity, N, of temporal motion vector predictor (TMVP) candidates for a motion vector predictor (MVP) list. In some embodiments, the quantity, N, of TMVP candidates is set to a default value (e.g., rather than being obtained from the video bitstream). The system identifies (656) a set of TMVP candidates, the set of TMVP candidates having a size less than or equal to N. In some embodiments, the system identifies (658) a set of spatial MVP candidates. The system generates (660) the MVP list using the set of TMVP candidates and the set of spatial MVP candidates. The system reconstructs (662) the first block using the MVP list.

In some embodiments, up to N TMVP candidates are inserted into MVP candidate list for skip mode and non-skip mode, where N is a positive integer, such as 1 or 2. In some embodiments, N is different values for skip mode MVP candidate list and non-skip mode MVP candidate list. For example, N may be equal to 1 for non-skip mode MVP candidate list and N may be equal to 2 for skip mode MVP candidate list. In some embodiments, multiple different N values are used for different MVP list. For example, a first MVP list for regular case, a second MVP list for inter-inter wedge mode, and a third MVP list for the warp reference list (when TMVP is used).

In some embodiments, the value of N can be updated during encoding and decoding. For example, depending how frequently TMVP is applied during encoding and decoding, more or less TMVP candidates can be used (as indicated by the value of N). In some embodiments, the value of N is signaled in high-level syntax. For example, at a sequence level, a frame level, a slice level, or a tile level in the bitstream.

In some embodiments, the value of N depends on the maximum allowed length of MVP list. In some embodiments, if the maximum allowed MVP list length is equal to or smaller than a predefined threshold (e.g., 4 or 5), N is set to a first value (e.g., 1 or 2). Otherwise, N is set to a second value (e.g., 2 or 3).

In some embodiments, if N is set to a first value (e.g., 1), outside TMVP candidate blocks are not scanned/checked. Otherwise, if N is greater than the first value (e.g., equal to 2 or 3), the outside TMVP candidate block are checked. In some embodiments, the scanning order and/or positions for inner TMVP candidates are different for the skip mode MVP candidate list and the non-skip mode MVP candidate list. For example, a reversed horizontal scanning order is used to check the inner TMVP candidate for non-skip mode MVP list, and a raster scan order is used to check the inner TMVP candidate for skip mode MVP list.

In some embodiments, outside TMVP candidate blocks are not scanned for a non-skip mode MVP list whereas outside TMVP candidate blocks are scanned for skip mode MVP lists.

Although FIGS. 6A and 6B illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that various stages could be implemented in hardware, firmware, software, or any combination thereof.

Turning now to some example embodiments.

(A1) In one aspect, some embodiments include a method (e.g., the method 600) of video encoding. In some embodiments, the method is performed at a computing system (e.g., the server system 112) having memory and control circuitry. In some embodiments, the method is performed at a coding module (e.g., the coding module 320). In some embodiments, the method is performed at an entropy coder (e.g., the entropy coder 214). The method includes: (i) obtaining video data comprising a plurality of blocks, including a first block; (ii) obtaining a first syntax element, the first syntax element indicating a quantity, N, of temporal motion vector predictor (TMVP) candidates for a motion vector predictor (MVP) list; (iii) identifying a set of TMVP candidates, the set of TMVP candidates having a size less than or equal to N; and (iv) generating the MVP list using at least the set of TMVP candidates. In some embodiments, the quantity of TMVP candidates is based on a frequency of use of MVP candidates in one or more previously coded blocks. In some embodiments, the quantity, N, of TMVP candidates is set to a default value (e.g., rather than being signaled via the first syntax element).

(A2) In some embodiments of A1, the quantity of TMVP candidates is based on whether a skip mode is enabled for the first block. In some embodiments, the quantity of TMVP candidates is based on whether a translation mode is active, a wedge mode is active, and/or a warp mode is active.

(A3) In some embodiments of A1 or A2, identifying the set of TMVP candidates includes scanning a plurality of TMVP candidate blocks in a particular scanning order, the particular scanning order is selected based on whether a skip mode is enabled for the first block.

(A4) In some embodiments of any of A1-A3, identifying the set of TMVP candidates includes: (i) scanning a first set of TMVP blocks in accordance with a determination that a skip mode is enabled; and (ii) scanning a second set of TMVP blocks in accordance with a determination that the skip mode is disabled, wherein the first set of blocks is different than the second set of blocks.

(A5) In some embodiments of any of A1-A4: (i) the MVP list is a first MVP list and corresponds to a first mode; and (ii) the method further includes obtaining an indication of a second quantity, M, of TMVP candidates for a second MVP list, where the second MVP list corresponds to a second mode, and wherein N is not equal to M.

(A6) In some embodiments of any of A1-A5, the quantity of TMVP candidates is selected based on previously decoded information.

(A7) In some embodiments of A6, the quantity of TMVP candidates is updated based on a frequency of application of TMVP during encoding.

(A8) In some embodiments of any of A1-A7, the first syntax element is part of a high-level syntax for a video bitstream. In some embodiments, the quantity of the TMVP candidates is signaled in the video bitstream. In some embodiments, the quantity of TMVP candidates for a particular mode (e.g., skip mode) is signaled relative to the quantity of TMVP candidates for a second mode. For example, a quantity N is signaled for a non-skip mode and a relative quantity (e.g., +1) is signaled for a skip mode.

(A9) In some embodiments of any of A1-A8, the quantity of TMVP candidates is selected based on a maximum length for the MVP list.

(A10) In some embodiments of A9, the quantity of TMVP candidates is selected based on whether the maximum length for the MVP list meets one or more criteria.

(A11) In some embodiments of any of A1-A10, identifying the set of TMVP candidates includes: (i) in accordance with a determination that N meets one or more criteria, checking one or more outside TMVP candidate blocks; and (ii) in accordance with a determination that N does not meet the one or more criteria, forgoing checking the one or more outside TMVP candidate blocks.

(A12) In some embodiments of any of A1-A11, the method further includes signaling the MVP list in a video bitstream.

(A13) In some embodiments of any of A1-A12, the method further includes identifying a set of spatial MVP candidates, where the MVP list is generated using at least the set of TMVP candidates and the set of spatial MVP candidates.

(B1) In another aspect, some embodiments include a method of video decoding (e.g., the method 650). In some embodiments, the method is performed at a computing system (e.g., the server system 112) having memory and control circuitry. In some embodiments, the method is performed at a coding module (e.g., the coding module 320). In some embodiments, the method is performed at a parser (e.g., the parser 254). The method includes: (i) receiving video data comprising a plurality of blocks, including a first block, from a video bitstream; (ii) obtaining a first syntax element from the video bitstream, the first syntax element indicating a quantity, N, of temporal motion vector predictor (TMVP) candidates for a motion vector predictor (MVP) list; (iii) identifying a set of TMVP candidates, the set of TMVP candidates having a size less than or equal to N; (iv) generating the MVP list using at least the set of TMVP candidates; and (v) reconstructing the first block using the MVP list. For example, N is a positive integer such as 1 or 2. In some embodiments, up to N TMVP candidates are inserted into MVP candidate list for skip mode and non-skip mode. In some embodiments, the quantity, N, of TMVP candidates is set to a default value (e.g., rather than being signaled via the first syntax element).

(B2) In some embodiments of B1, the quantity of TMVP candidates is based on whether a skip mode is enabled for the first block. In some embodiments, the method further includes obtaining a second syntax element from the video bitstream, the second syntax element indicating whether a skip mode is enabled for the first block. In some embodiments, the first syntax element indicates the quantity of TMVP candidates for the skip mode. In some embodiments, the first syntax element indicates a second quantity of TMVP candidates for a non-skip mode. In some embodiments, a third syntax element indicates the second quantity of TMVP candidates for a non-skip mode. For example, N is equal to 1 for a non-skip mode MVP candidate list and N is equal to 2 for a skip mode MVP candidate list.

(B3) In some embodiments of B1 or B2, identifying the set of TMVP candidates includes scanning a plurality of TMVP candidate blocks in a particular scanning order, and the particular scanning order is selected based on whether a skip mode is enabled for the first block. For example, the scanning order and/or positions for inner TMVP candidates may be different for skip mode MVP candidate list and non-skip mode MVP candidate list. In some embodiments, the scanning order and/or positions for inner TMVP candidates are different for the skip mode MVP candidate list as compared to the non-skip mode MVP candidate list. For example, a reversed horizontal scanning order is used to check the inner TMVP candidate for the non-skip mode MVP list, and a raster scan order is used to check the inner TMVP candidate for the skip mode MVP list.

(B4) In some embodiments of any of B1-B3, identifying the set of TMVP candidates includes: (i) scanning a first set of TMVP blocks in accordance with a determination that a skip mode is enabled; and (ii) scanning a second set of TMVP blocks in accordance with a determination that the skip mode is disabled, wherein the first set of blocks is different than the second set of blocks. For example, outside TMVP candidate blocks are not checked for a non-skip mode MVP list, and outside TMVP candidate blocks are checked for a skip mode MVP list.

(B5) In some embodiments of any of B1-B4: (i) the MVP list is a first MVP list and corresponds to a first mode; and (ii) the method further includes obtaining, from the video bitstream, an indication of a second quantity, M, of TMVP candidates for a second MVP list, where the second MVP list corresponds to a second mode, and wherein N is not equal to M. For example, multiple different quantity values can be used for different MVP lists, such as an MVP list for a regular case, an MVP list for inter-inter wedge mode, and warp reference list (when TMVP is used).

(B6) In some embodiments of any of B1-B5, the quantity of TMVP candidates is selected based on previously decoded information. For example, the value of N can be updated during encoding and decoding.

(B7) In some embodiments of B6, the quantity of TMVP candidates is updated based on a frequency of application of TMVP during encoding. For example, depending on how frequently TMVP is applied during encoding and/or decoding, more or less TMVP candidates can be used (as indicated by the value of N).

(B8) In some embodiments of any of B1-B7, the first syntax element is part of a high-level syntax in the video bitstream. For example, the high-level syntax corresponds to a sequence level, a frame level, a slice level, or a tile level. In some embodiments, the high-level syntax is higher than a block level. For example, the high-level syntax may include a video parameter set (VPS), a sequency parameter set (SPS), a picture parameter set (PPS), an adaptive parameter set (APS), a slice header, a picture header, a tile header, and/or a CTU header.

(B9) In some embodiments of any of B1-B8, the quantity of TMVP candidates is selected based on a maximum length for the MVP list. In some embodiments, the method further includes obtaining a length for the MVP list from the video bitstream. In some embodiments, the quantity, N, of TMVP candidates is based on the length of the MVP list. For example, the value of N depends on the maximum allowed length of the MVP list.

(B10) In some embodiments of B9, the quantity of TMVP candidates is selected based on whether the maximum length for the MVP list meets one or more criteria. For example, if the maximum allowed MVP list length is equal to or smaller than a threshold, S1, N is set to 1. Otherwise, N is set to 2. In one example, S1 is set to 4.

(B11) In some embodiments of any of B1-B10, identifying the set of TMVP candidates includes: (i) in accordance with a determination that N meets one or more criteria, checking one or more outside TMVP candidate blocks; and (ii) in accordance with a determination that N does not meet the one or more criteria, forgoing checking the one or more outside TMVP candidate blocks. For example, if N is set to 1, an outside TMVP candidate block is not checked. Otherwise, if N is greater than 1, the outside TMVP candidate block is checked.

(B12) In some embodiments of any of B1-B11, the method further includes identifying a set of spatial MVP candidates, where the MVP list is generated using at least the set of TMVP candidates and the set of spatial MVP candidates.

(B13) In some embodiments of any of B1-B12, the bitstream corresponds to video encoded in accordance with any of A1-A13.

The methods described herein may be used separately or combined in any order. Each of the methods may be implemented by processing circuitry (e.g., one or more processors or one or more integrated circuits). In some embodiments, the processing circuitry executes a program that is stored in a non-transitory computer-readable medium.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A13 and B1-B13 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A13 and B1-B13 above).

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:
   receiving a video bitstream comprising a plurality of blocks, including a first block;
   obtaining a first syntax element from the video bitstream, the first syntax element indicating a quantity, N, of temporal motion vector predictor (TMVP) candidates for a motion vector predictor (MVP) list, wherein N is an integer greater than 1;

identifying a set of TMVP candidates, the set of TMVP candidates having a size less than or equal to N;

generating the MVP list using at least the set of TMVP candidates; and reconstructing the first block using the MVP list.

2. The method of claim 1, wherein the quantity of TMVP candidates is based on whether a skip mode is enabled for the first block.

3. The method of claim 1, wherein identifying the set of TMVP candidates comprises scanning a plurality of TMVP candidate blocks in a particular scanning order, and wherein the particular scanning order is selected based on whether a skip mode is enabled for the first block.

4. The method of claim 1, wherein identifying the set of TMVP candidates comprises:

scanning a first set of TMVP blocks in accordance with a determination that a skip mode is enabled; and scanning a second set of TMVP blocks in accordance with a determination that the skip mode is disabled, wherein the first set of blocks is different than the second set of blocks.

5. The method of claim 1, wherein the MVP list is a first MVP list and corresponds to a first mode; and the method further comprises obtaining, from the video bitstream, an indication of a second quantity, M, of TMVP candidates for a second MVP list, wherein the second MVP list corresponds to a second mode, and wherein N is not equal to M.

6. The method of claim 1, wherein the quantity of TMVP candidates is selected based on previously decoded information.

7. The method of claim 6, wherein the quantity of TMVP candidates is updated based on a frequency of application of TMVP during encoding.

8. The method of claim 1, wherein the first syntax element is part of a high-level syntax in the video bitstream.

9. The method of claim 1, wherein the quantity of TMVP candidates is selected based on a maximum length for the MVP list.

10. The method of claim 9, wherein the quantity of TMVP candidates is selected based on whether the maximum length for the MVP list meets one or more criteria.

11. The method of claim 1, wherein identifying the set of TMVP candidates comprises:

in accordance with a determination that N meets one or more criteria, checking one or more outside TMVP candidate blocks; and in accordance with a determination that N does not meet the one or more criteria, forgoing checking the one or more outside TMVP candidate blocks.

12. The method of claim 1, further comprising identifying a set of spatial MVP candidates, wherein the MVP list is generated using the set of TMVP candidates and the set of spatial MVP candidates.

13. A computing system, comprising:

control circuitry;

memory; and one or more sets of instructions stored in the memory and configured for execution by the control circuitry, the one or more sets of instructions comprising instructions for:

receiving a video bitstream comprising a plurality of blocks, including a first block;

obtaining a first syntax element from the video bitstream, the first syntax element indicating a quantity, N, of temporal motion vector predictor (TMVP) candidates for a motion vector predictor (MVP) list, wherein N is an integer greater than 1;

identifying a set of TMVP candidates, the set of TMVP candidates having a size less than or equal to N;

generating the MVP list using at least the set of TMVP candidates; and reconstructing the first block using the MVP list.

14. The computing system of claim 13, wherein the quantity of TMVP candidates is based on whether a skip mode is enabled for the first block.

15. The computing system of claim 13, wherein identifying the set of TMVP candidates comprises scanning a plurality of TMVP candidate blocks in a particular scanning order, and wherein the particular scanning order is selected based on whether a skip mode is enabled for the first block.

16. The computing system of claim 13, wherein identifying the set of TMVP candidates comprises:

scanning a first set of TMVP blocks in accordance with a determination that a skip mode is enabled; and scanning a second set of TMVP blocks in accordance with a determination that the skip mode is disabled, wherein the first set of blocks is different than the second set of blocks.

17. The computing system of claim 13, wherein the quantity of TMVP candidates is selected based on previously decoded information.

18. A non-transitory computer-readable storage medium storing one or more sets of instructions configured for execution by a computing device having control circuitry and memory, the one or more sets of instructions comprising instructions for:

receiving a video bitstream comprising a plurality of blocks, including a first block;

obtaining a first syntax element from the video bitstream, the first syntax element indicating a quantity, N, of temporal motion vector predictor (TMVP) candidates for a motion vector predictor (MVP) list, wherein N is an integer greater than 1;

identifying a set of TMVP candidates, the set of TMVP candidates having a size less than or equal to N;

generating the MVP list using at least the set of TMVP candidates; and reconstructing the first block using the MVP list.

19. The non-transitory computer-readable storage medium of claim 18, wherein the quantity of TMVP candidates is based on whether a skip mode is enabled for the first block.

20. The non-transitory computer-readable storage medium of claim 18, wherein identifying the set of TMVP candidates comprises scanning a plurality of TMVP candidate blocks in a particular scanning order, and wherein the particular scanning order is selected based on whether a skip mode is enabled for the first block.

* * * * *